United States Patent
Madlener et al.

(10) Patent No.: US 7,202,680 B2
(45) Date of Patent: Apr. 10, 2007

(54) TOUCH PROBE

(75) Inventors: Wolfgang Madlener, Königsbergerstrasse 12, D-88212 Ravensburg (DE); Wilfried Veil, Schornreuteweg 15, D-88212 Ravensburg (DE); Matthias Armbrust, Wangen (DE)

(73) Assignees: Wolfgang Madlener, Ravensburg (DE); Wilfried Veil, Ravensburg (DE)

( * ) Notice: Subject to any disclaimer, the term of this patent is extended or adjusted under 35 U.S.C. 154(b) by 0 days.

(21) Appl. No.: 11/358,902

(22) Filed: Feb. 21, 2006

(65) Prior Publication Data

US 2006/0197541 A1    Sep. 7, 2006

(30) Foreign Application Priority Data

Feb. 24, 2005  (DE) .................. 10 2005 008 822
Apr. 6, 2005   (DE) .................. 10 2005 015 890

(51) Int. Cl.
  *G01R 31/02*  (2006.01)
  *G01B 5/00*   (2006.01)

(52) U.S. Cl. .................. 324/754; 324/756; 33/558; 33/561

(58) Field of Classification Search .................. None
See application file for complete search history.

(56) References Cited

U.S. PATENT DOCUMENTS

| 4,153,998 | A |   | 5/1979 | McMurtry .................. 33/550 |
|---|---|---|---|---|
| 5,669,152 | A | * | 9/1997 | McMurtry .................. 33/559 |
| 6,114,711 | A | * | 9/2000 | Stavrides ............... 250/559.33 |
| 6,275,053 | B1 | * | 8/2001 | Morrison et al. ........... 324/754 |
| 6,918,713 | B2 | * | 7/2005 | Kramski ..................... 403/292 |

FOREIGN PATENT DOCUMENTS

| DE | 27 43 665 A1 | 4/1978 |
|---|---|---|
| DE | 36 23 614 A1 | 1/1988 |
| DE | 36 27 103 C1 | 1/1988 |
| DE | 38 11 235 A1 | 10/1989 |
| DE | 38 24 548 A1 | 1/1990 |
| DE | 94 11 566 | 7/1994 |
| DE | 195 16 272 A1 | 11/1996 |
| DE | 197 38 736 A1 | 3/1998 |
| DE | 10 2004 003 048 A1 | 8/2004 |
| DE | 699 19 457 T2 | 1/2005 |
| EP | 0 967 455 B1 | 6/1999 |

OTHER PUBLICATIONS

U.S. Appl. No. 11/358,727, filed Feb. 21, 2006, Madlener et al.

* cited by examiner

*Primary Examiner*—Andrew H. Hirshfeld
*Assistant Examiner*—Timothy J. Dole
(74) *Attorney, Agent, or Firm*—Burr & Brown

(57) ABSTRACT

A touch probe is provided, including a deflectable stylus with a rest position mechanism on which the stylus is arranged, and a housing in which the rest position mechanism is accommodated. The rest position mechanism includes a stylus holder with carrying elements and seating elements corresponding to the carrying elements that interact with the carrying elements to arrange the stylus holder in the touch probe. The carrying elements and seating elements form a sensing circuit which is closed when the carrying elements are in contact with the seating elements and which is open when one of the carrying elements is not in contact with a corresponding seating element. The carrying elements are provided with electrical contacting means that is formed independently of a clamping device.

8 Claims, 3 Drawing Sheets

TOUCH PROBE

FIELD OF THE INVENTION

The present invention relates to a touch probe.

BACKGROUND OF THE INVENTION

The German translation DE 699 19 457 T2 of European patent EP 0 967 455 discloses a touch probe of the type referred which comprises a stylus holder and a stylus which can enter into contact with a workpiece and which is connected to the stylus holder. The touch probe also includes seating elements, carrying elements provided on the stylus holder which interact with the seating elements to arrange the stylus holder in the touch probe, and an electric circuit.

The seating elements are part of the electric circuit. The electric circuit is closed when all the carrying elements are in contact with both of their assigned pairs of seating elements. An interruption of the electric circuit takes place whenever one of the carrying elements loses contact with one of the seating elements. This circuit interruption is sensed, for example, by a corresponding controller as a measuring signal. The touch probe also comprises electrically conducting elements, which form part of the electric circuit and which are arranged such that they each connect one seating element of a seating element pair to a next seating element of an adjacent seating element pair.

A clamp is also provided, which applies a clamping force that clamps the seating elements in position and urges the seating elements and the electrically conducting elements into electrical contact with one another.

In DE 195 16 272 A1, such seating elements are connected to one another in a corresponding way on the basis of a printed circuit board. The contact between an interconnect of the printed circuit board and the seating elements is in this case likewise realized by a spring-loaded press fit (cf. also DE 94 11 566 U1). Further, similar contact in such a sensor circuit is known from DE 197 38 736 A1.

In comparison with adhesively bonded seating elements, also known from the prior art (cf. U.S. Pat. No. 4,153,998), advantages are indeed obtained by the touch probe according to the present invention with regard to the mounting and reliable electrical insulation of the seating elements.

SUMMARY OF THE INVENTION

The present invention is based on the object of further improving a touch probe of the type described above.

The present invention provides a touch probe wherein electrical conducting means are connected to at least one seating element, preferably to all of the seating elements in each case, by a contacting means in which the electrical conducting means are secured directly on at least one seating element, preferably on all of the seating elements. With this type of contact, the contacting forces are provided separately for the respective seating elements and have a neutral external force effect. In this way, high contact reliability can be realized. Moreover, the seating elements can be clamped independently of an electrical connection of the seating elements, which has positive effects on the mounting of the stylus holder.

The electrical conducting means may be connected to a seating element for example by a permanent electrical contacting. The connection may take place, for example, in the form of a soldered or welded connection, for example by an ultrasonic welding method.

In order to ensure high contact reliability, it is in this case preferred that the connecting point includes a surface structure which has an electrical contact property that is improved with respect to the remaining seating element material. The surface structure is preferably created over only part of the surface of the seating element, so that the material properties of the seating element as a bearing are still available.

Gold comes into consideration, for example, as a coating on the contact point.

Further permanent connections may be realized in the form of a screw, plug-in, snap or bayonet, adhesive or press-fit connection. For example, an electrical conducting means is pressed into a prepared recess of the seating element. In the case of an adhesive connection, it is preferred that the adhesive itself has good electrical conducting properties, so that the adhesive joint has lowest possible contact resistance.

This procedure is based on the recognition that, as a result, the electrical contact resistance between a seating element and an electrical conductor connected thereto can be adversely influenced much less by changing mechanical and/or thermal conditions.

To insulate the seating element from other elements of the touch probe, in particular from the housing, and to avoid electrical short-circuits, insulation may be applied to the seating element, preferably likewise in certain regions. Particularly advantageous in this respect is a mechanically stable insulating layer, which may in principle be formed by any desired material, for example, by an oxidation layer as long as it is mechanically strong enough. This is, on the one hand, mechanically strong and on the other hand, provides uniform bearing contact, so that the measuring accuracy of the touch probe remains as uninfluenced as possible.

According to one embodiment of the present invention, the electrical conductor connecting two seating elements is formed as a wire. Single- and/or multi-conductor wires, which are preferably insulated outside of the contact region and which are optionally rigid or flexible, are suitable for this purpose. A rigid wire maintains its shape so that the seating elements connected thereto can be positioned in a correspondingly pre-bent manner as a fixed insert unit. In contrast, a flexible wire has the advantage that, during the assembly of the touch probe, the routing of the wire in the touch probe housing can, if necessary, be adapted to other components or made to go around them.

In order to allow this part of the sensing circuit to be externally contacted, a terminal contact may be formed on at least one electrical conductor, which interacts with a led-out lead to provide a signal.

In addition, it is further proposed that the carrying elements interacting with the seating elements are arranged in bushing means which are formed such that they electrically insulate the carrying elements with respect to the stylus holder. This measure ensures that the carrying elements do not short-circuit the circuit with seating elements and carrying elements via the stylus holder. In order to help achieve a low-cost construction of the touch probe, it is additionally preferred that the carrying elements are commercially available pin elements, in particular in accordance with DIN standards.

In order to obtain electrical access to the circuit, it is also proposed that the circuit preferably has two commercially available contacts, which have spring contact pins.

Furthermore, it is preferred that the carrying elements are fastened to the stylus holder by a clamping device.

This procedure is based on the recognition that, in the case of carrying elements that are merely inserted in a stylus holder, inaccuracies in the measuring operation of the touch probe can occur, in particular due to bending. The separate bracing of the carrying elements, for example by means of a plate which is fastened by screw means, has the effect of producing a rigid arrangement, with which an improvement of the measuring accuracy of the touch probe can be achieved, in particular with regard to the reproducibility of a measuring point.

A further advantageous aspect of the invention is that the rest position mechanism comprises a spring element for positioning the stylus holder which presses onto the stylus holder, and setting means that allow the pressing force of the spring element to be set which are provided in the stylus holder.

As a result, setting the spring force on the stylus holder can be performed in an elegant way from the direction of the stylus. For this purpose, it is preferred that the setting means include a setting element which is adjustable in the longitudinal direction of the touch probe. For example, the stylus can be removed, making access possible to a screw element inside the stylus holder to adjust the latter.

In particular, in the case of this configuration for setting the pressing force of the spring element, it is further preferred that the spring element comprises a spring wire which is formed on the stylus holder as a pin which runs in the direction of the axis of the touch probe and that a recess for the pin is provided in the stylus holder. The spring force can then take place, for example, by turning the part of the stylus holder in which the recess is provided. In this case, this part turns with respect to the spring element, whereas the spring element does not turn with it. The turning operation preferably has the effect that the linear position of the part with the recess changes, so that the spring can either be more biased or allowed to relax.

A further essential aspect of the present invention is that the housing is cup-shaped, that is to say does not have any significant openings on one side, and therefore can only be loaded through a cup opening on one side. If necessary, comparatively small access openings are provided in the bottom of the cup, which is integrally connected to the housing. However, the cup is preferably completely closed at the bottom.

This allows the housing to be formed in a stable manner. Furthermore, it is possible to dispense entirely with the attachment of a screwed or otherwise fastened cover element on one side.

In the case of this embodiment, the structural design should be chosen such that all the elements be introduced through the cup opening on one side, but also such that corresponding fastening of the parts is possible from this side.

Furthermore, it is advantageous if the touch probe is filled with oil, which is optimized, in particular with regard to its sliding properties.

A further major aspect of the present invention is that the touch probe contains a vibration device. Vibrations on the touch probe always allow a secure seating of the carrying elements on the seating elements to be achieved, with correspondingly high positioning accuracy. It has the effect that vibrations are transmitted to the touch probe for a predeterminable time period after closing the sensing circuit. As a result, the carrying elements reach an end position between the seating elements even after a short time, so that high switching repetition accuracy can be realized, since the end position of the carrying elements is reproducible to a high degree.

In a preferred configuration, a vibration device may comprise an unbalanced motor.

BRIEF DESCRIPTION OF THE DRAWINGS

An exemplary embodiment of the invention is explained more precisely below with further advantages and details as it is shown in the accompanying drawings, in which.

DETAILED DESCRIPTION OF THE INVENTION

Figure 1:
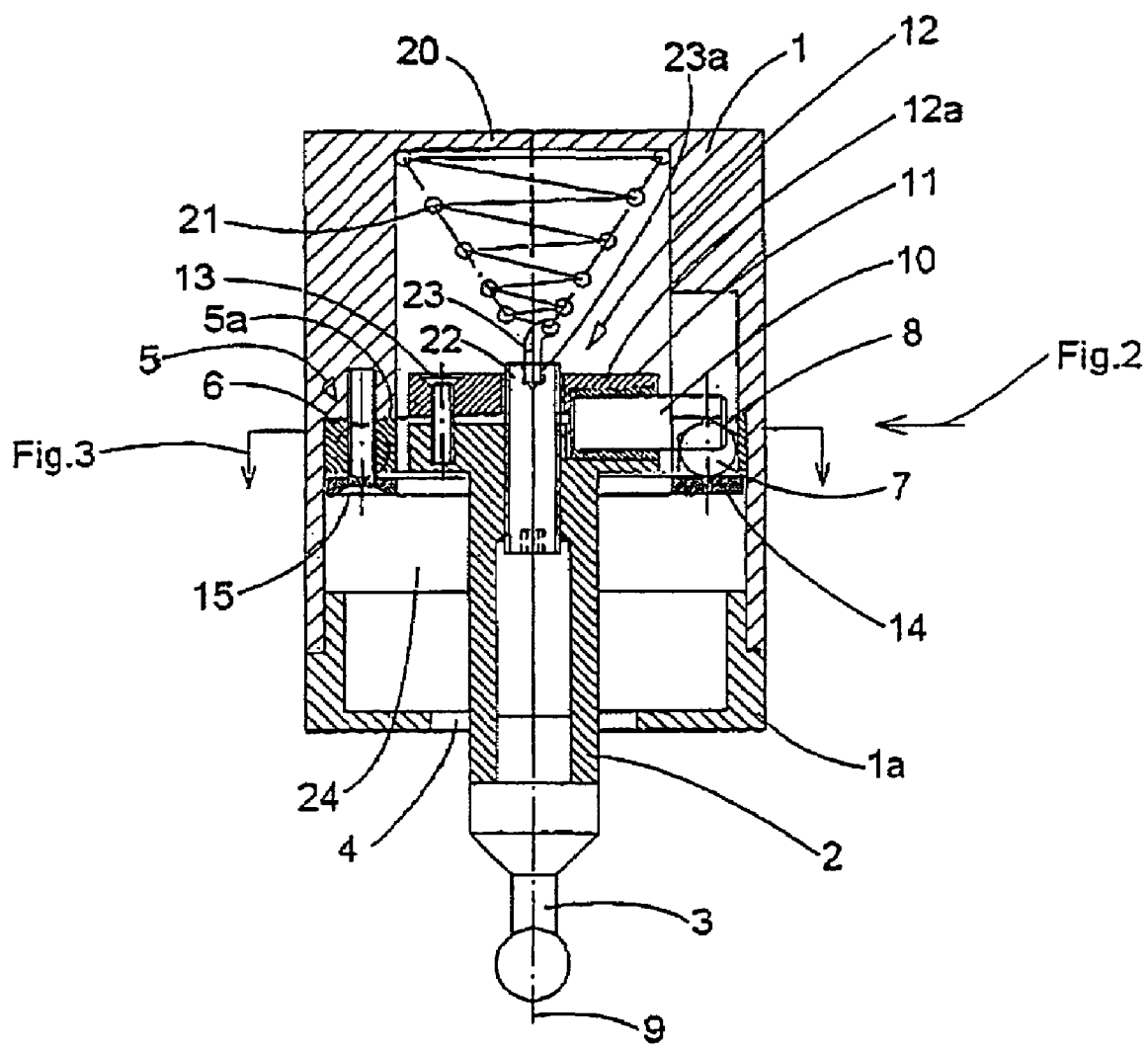
FIG. 1 is a schematic cross-sectional view through a touch probe.

FIG. 1 shows a touch probe with an outer housing 1, which preferably consists of steel and has a stepped inner form 5.

Arranged in the housing 1 is a stylus holder 2 with a stylus 3. The stylus 3 and part of the stylus holder 2 protrude from the housing 1 in the direction of the longitudinal axis 9 of the touch probe through an opening 4 in a cover element 1a of the housing 1. As a result, the stylus 3 is capable of touching a workpiece or tool or being touched by it when a relative movement takes place between the touch probe and the workpiece or tool.

Seated on an offset 5a of the stepped inner form 5 of the housing 1 is a carrier 6 for receiving seating elements 7, shown here in the form of balls. In the carrier 6 there are recesses 8 for receiving the balls 7. The recesses 8 are arranged in pairs. Three pairs are respectively positioned such that they are offset by 120° about the axis 9. The recesses 8 are in this case shaped such that when the balls 7 are pressed into the recesses 8, they are clamped in such a way that kinematically stable mounting is obtained. The recesses 8 may for example have the form of a cone or a three-sided pyramid, at least in certain portions.

The spacing of the balls 7 in a pair is such that they can be bridged by a roller 10 of the stylus holder 2 to bring about an electrical contact and form a stable seat for the roller.

The carrier 6 for the balls 7 preferably consists of metal, in order to ensure the most rigid possible mounting of the balls 7. In this case, the surface of the recesses 8 for receiving the balls 7 at least is preferably provided with an electrically insulating layer. The carrier 6 may therefore consist for example of aluminum, the surface of which has been given an electrically insulating property by anodizing.

Figure 2:
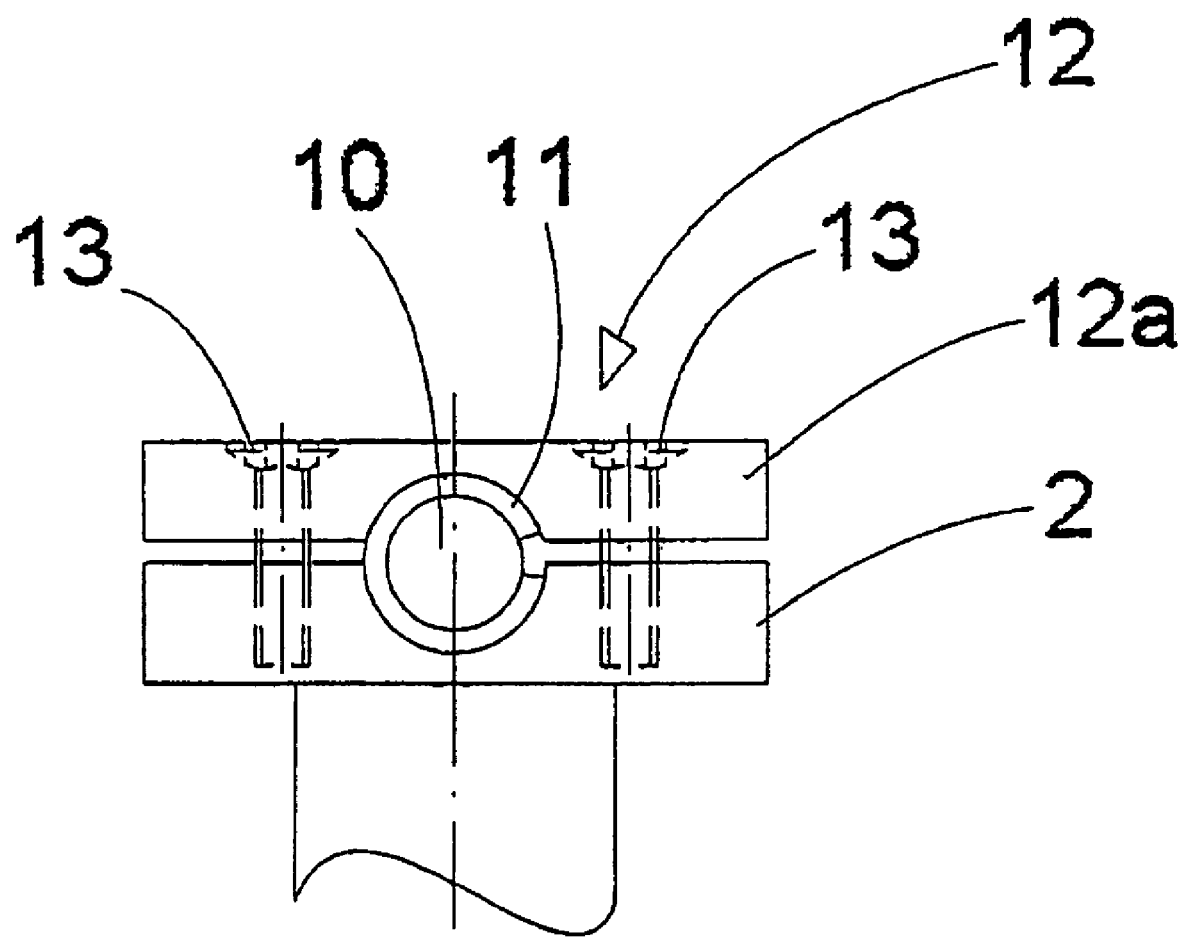
FIG. 2 is a view from the right of part of the rest position mechanism, which comprises a clamping device for a carrying element.

The balls 7 are pressed into the recesses 8 of the carrier 6 by means of a clamping device 14, 15. At the same time, the carrier 6 is also fixed on the housing 1 by the clamping devices 14, 15. The pressing force on the balls 7 is applied, for example, by at least two screws 15, which for example draw a clamping ring 14 of the clamping device toward the step 5a of the housing. In order to obtain the best-possible fixing of the balls 7, six screws 15 are preferably used, each screw being positioned as close as possible to one of the six balls 7 in each case. The rollers 10 are mounted in bushings 11, which may be slit or divided along their length (also see FIG. 2 in this respect). In particular in the case of a slit or divided configuration of the bushings, the rollers 10 can be rigidly fixed in the stylus holder 2 by means of a clamping device 12 of the stylus holder 2.

The bushings 11 and a plate 12a of the clamping device 12 are preferably made of metal, in order to obtain the most rigid possible fixing of the rollers. The surface of the bushings and the clamping device preferably have an electrically insulating layer. The bushings and the plate 12a of the clamping device 12 may consist for example of aluminum, the surface of which has an electrically insulating property as a result of anodizing. The clamping force on the bushings 11 and also the rollers 10 is applied, for example, by at least two screws 13, which draw the plate 12a of the clamping device 12 toward the rest of the stylus holder.

In order for the touch probe to generate a signal when the stylus 3 changes its position, either by tilting or vertical movement, the balls 7 are electrically connected in series and form a circuit in which the rollers 10 establish an electrical contact between the two balls of each pair of balls.

Figure 3:
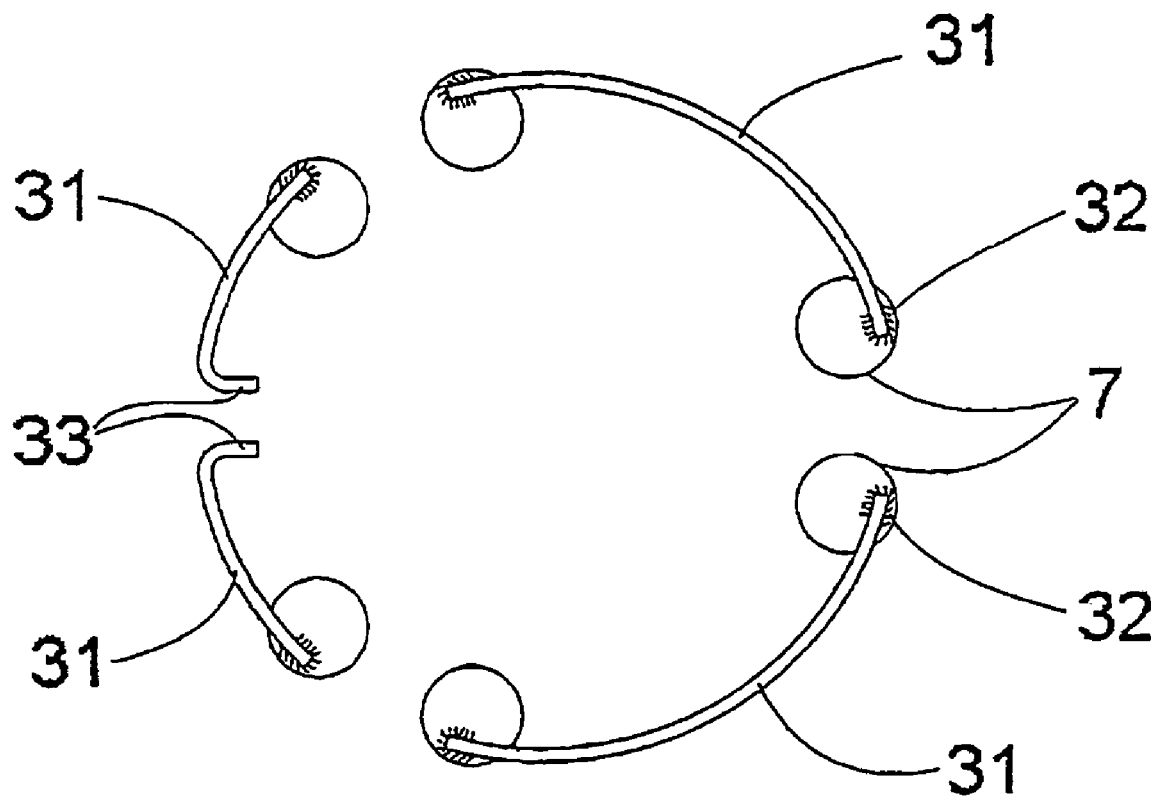
FIG. 3 is a plan view of an arrangement of supporting elements of the touch probe as shown in FIG. 1 that are connected to one another in an electrically conducting manner.

In order to connect the balls 7 and the rollers 10 to form a complete circuit, a conducting means, preferably an element 31 in wire form, respectively between two balls of adjacent pairs of balls, is firmly connected to the balls 7 at a point 32 (see FIG. 3 in this respect). At the ends 33 of the elements 31 in wire form, a switching signal can be brought out.

At least at the soldered joint 32, the balls 7 advantageously have a coating which ensures good adhesion for a soldered connection. In a preferred embodiment, the coating is not applied over the entire ball but only in the region of the soldered joint or in the region of the soldered joint and regions which do not serve as bearing surfaces for the ball itself or the roller. A coating in the region on which the carrying elements 10 lie may be disadvantageous. The coating of the balls 7 preferably consists of gold.

In FIG. 3, the connection between the electrical connecting element 31 and a seating element 7 is indicated symbolically by many small lines. This symbolic representation may, for example, also stand for a different type of connection means such as an adhesive connection or a welded connection, such as an ultrasonic welded connection.

A preferably conical helical spring 21, supported on a bottom 20 of the housing 1, urges the stylus holder 2 into its zero position, which is predetermined by the combination of rollers 10 and balls 7.

A setting element 22, which is integrated in the stylus holder 2 and can be moved in relation to the stylus holder 2 in the direction of the axis 9, preferably by means of a thread, provides the possibility of setting the compressive force of the helical spring 21 on the stylus holder 2.

For this purpose, it is merely required that the stylus 3 is removed. As a result, the complete touch probe can remain in a mount, for example of a measuring machine, during a setting operation.

The helical spring 21 comprises a pin 23 in the axial direction, which is seated in a recess 23a in the stylus holder 2.

Preferably, a series connection of electrically conducting connecting elements 31, balls 7 and rollers 10 is externally contacted at the ends 33 of the connecting elements 31. Or, considered in functional terms, at these points it is preferably possible for a switching signal to be brought out by interruption of the circuit.

While the present invention has been particularly shown and described with reference to the preferred mode as illustrated in the drawings, it will be understood by one skilled in the art that various changes may be effected therein without departing from the spirit and the scope of the invention as defined by the claims.

The invention claimed is:

1. A touch probe comprising:
   a deflectable stylus having a rest position mechanism on which the stylus is arranged; and
   a housing in which the rest position mechanism is accommodated;
   wherein the rest position mechanism comprises a stylus holder including a plurality of carrying elements and a plurality of seating elements corresponding to the carrying elements and which interact with the carrying elements in order to arrange the stylus holder in the touch probe, wherein the carrying elements and the seating elements form a sensing circuit which is closed when the carrying elements are in contact with the seating elements and which is open when at least one of the carrying elements does not contact a corresponding seating element;
   wherein electrical conducting means are directly permanently secured and connected to at least one of the seating elements; and
   wherein a partial gold coating is provided on the seating elements in a region of a contact point between the seating element and a respective one of the conducting means, and a soldered connection is formed between the conducting means and the contact point on the respective seating elements.

2. The touch probe as claimed in claim 1, wherein an insulating layer is attached to the seating elements.

3. The touch probe as claimed in claim 1, wherein the electrical conducting means comprise a wire.

4. The touch probe as claimed in claim 1, wherein a terminal contact is provided on the electrical conducting means to provide an external contact for the sensing circuit.

5. The touch probe as claimed in claim 1, wherein the sensing circuit comprises terminal contacts having spring contact pins.

6. The touch probe as claimed in claim 1, wherein the carrying elements comprise commercially available pin elements.

7. The touch probe as claimed in claim 6, wherein the carrying elements comprise pin elements in accordance with DIN 6325.

8. The touch probe as claimed in claim 1, wherein electrical conducting means are directly secured and connected to each seating element, respectively.

* * * * *